(No Model.)

J. S. ALCORN.
MACHINIST'S PLANER.

No. 325,229. Patented Sept. 1, 1885.

Witnesses:
Frank K. Pierpont
William H. Allsmith

Inventor:
John S. Alcorn
by Albert H. Walker, Atty.

UNITED STATES PATENT OFFICE.

JOHN S. ALCORN, OF HARTFORD, CONNECTICUT, ASSIGNOR OF ONE-HALF TO JOEL B. SEXTON, OF SAME PLACE.

MACHINIST'S PLANER.

SPECIFICATION forming part of Letters Patent No. 325,229, dated September 1, 1885.

Application filed June 29, 1885. (No model.)

*To all whom it may concern:*

Be it known that I, JOHN S. ALCORN, of Hartford, Connecticut, have invented a new and useful Improvement in Machinists' Planers, of which the following description and claim constitute the specification, and which is illustrated by the accompanying sheet of drawings.

This invention is a mechanism for lifting the cutting-tool away from all contact with the thing being planed at the end of the forward stroke of the carriage which carries that thing, and for lowering that tool to its former position at the end of the backward stroke of that carriage.

Figure 1:
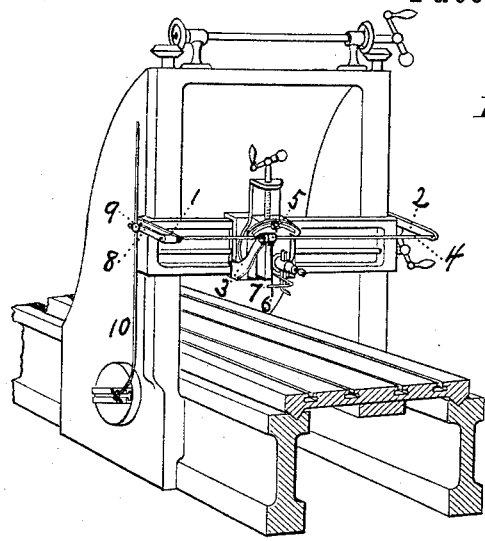
Figure 2:
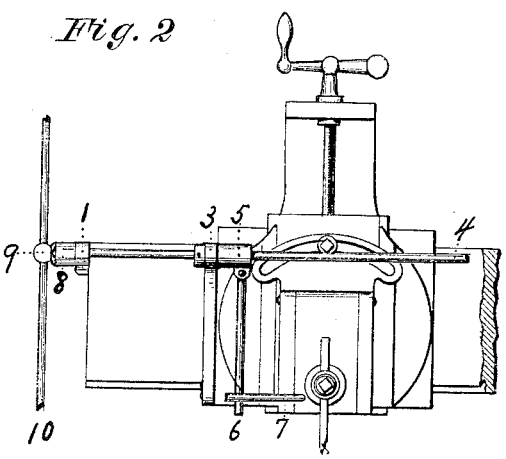
Figure 3:
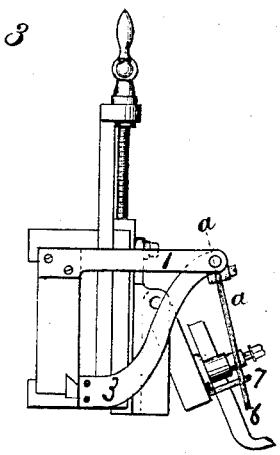
Figure 4:
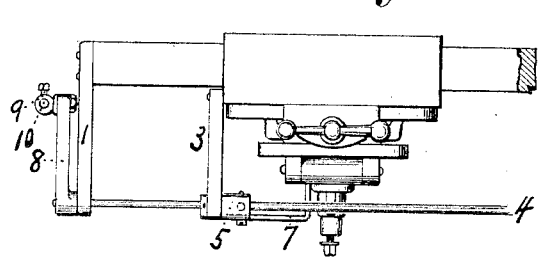
Figure 5:
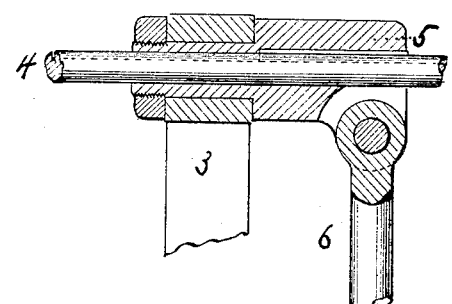

Figure 1 of the drawings is a perspective fragmentary view of a planer. Fig. 2 is a fragmentary front elevation of the cross-head thereof with its appurtenances. Fig. 3 is a view of the left-hand end of the same. Fig. 4 is a plan view of what is shown in Fig. 2. Fig. 5 is a cross-section, looking to the left, on the line *a a* of Fig. 3.

The parts of my invention are those numbered 1 to 10, inclusive. Two rigid arms, 1 and 2, are bolted to the respective ends of the cross-head and project horizontally therefrom. The rigid arm 3 is bolted to the side of the head, which reciprocates on the cross-head of the planer. The shaft 4 turns in bearings in the ends of the arms 1 and 2. The collar 5 is splined to the shaft 4 and turns with it in a bearing in the end of the arm 3. The arm 6 is pivoted by a set-screw to ears which project downward from the collar 5, but is rigidly held by those ears, so as to oscillate with the collar. The hook 7 projects from the apron which carries the tool-post, and bends around the outer side of the arm 6. The arm 8 is keyed to the left-hand end of the shaft 4. The eyebolt 9 has its shank turning in a horizontal hole near the outer end of the arm 8. The rod 10 has its upper end fastened in the eye of the eyebolt 9 by a set-screw, and has its lower end attached to the feed-motion of the planer by being fixed in the groove which appears on the face of the disk shown in the drawings. Such a grooved disk, oscillating upon an axis at its center and receiving motion from other parts of the planer, is a well-known part of such a machine.

The mode of operation is as follows: When the grooved disk oscillates upon its axis at the end of the forward stroke of the carriage which carries the thing being planed or grooved under the cutting-tool, then it operates to pull downward upon the rod 10. That rod thus rocks the arm 8, the shaft 4, and the arm 6; and the latter arm, through the hook 7, raises the apron, which carries the tool-post upon the hinge of the apron, and thus lifts the cutting-tool entirely away from all contact with the thing being operated upon by it. The tool is then held in that position during the backward stroke of the carriage, and at the end of that stroke the grooved disk oscillates back to its former position, and thus rocks back the arm 8, the shaft 4, and the arm 6 to their former places. Thus relieved from the action of those parts, the apron falls back to its perpendicular rest against the head, and the cutting-tool is thus restored to its cutting position. The spline between the shaft 4 and the collar 5 enables the shaft to rock the arm 6 at whatever place on the shaft the arm 3, reciprocating with the head, may have forced the collar to work. The eyebolt 9 enables the outer end of the arm 8 to be fixed to the rod 10 at any place made necessary by the changes in vertical adjustment which are incident to the cross head of the planer. The set-screw which attaches the arm 6 to the collar 5 enables the lower end of that arm to be adjusted relatively to its distance from the vertical center of the head as occasion may require; but the arm 6 may be made integral with the collar 5, and other changes may be made in the mechanism without changing the identity of the invention.

I claim as my invention—

The combination of the arm 3, shaft 4, arm 6, hook 7, arm 8, and rod 10 with the feed-motion, horizontally-reciprocating head, and cutting-tool of a machinist's planer, substantially as described.

JOHN S. ALCORN.

Witnesses:
WILLARD EDDY,
ALBERT H. WALKER.